United States Patent [19]
Sato et al.

[11] Patent Number: 5,257,585
[45] Date of Patent: Nov. 2, 1993

[54] INCINERATOR

[75] Inventors: Keiichi Sato; Yukio Yamagishi, both of Kanagawa; Kazuyoshi Shimizu, Chiba; Hiroshi Yoshida, Kanagawa, all of Japan

[73] Assignee: Ebara Corporation, Tokyo, Japan

[21] Appl. No.: 7,351

[22] Filed: Jan. 21, 1993

Related U.S. Application Data

[63] Continuation of Ser. No. 863,040, Apr. 3, 1992, abandoned.

[30] Foreign Application Priority Data

Apr. 15, 1991 [JP] Japan ................. 3-109874

[51] Int. Cl.⁵ ..................... F23G 5/00; F23G 7/00
[52] U.S. Cl. .................... 110/245; 110/214; 110/297; 122/4 D
[58] Field of Search ........... 110/245, 248, 211, 214, 110/314, 297, 235, 234; 122/4 D, 6 A

[56] References Cited

U.S. PATENT DOCUMENTS

| | | | |
|---|---|---|---|
| 3,885,507 | 5/1975 | Davy et al. | 110/214 |
| 4,300,460 | 11/1981 | Lamb et al. | |
| 4,345,529 | 8/1982 | Weber et al. | 110/214 X |
| 4,538,529 | 9/1985 | Temelli | 110/214 X |
| 4,940,006 | 7/1990 | Temelli | |
| 5,009,173 | 4/1991 | Temelli | |

FOREIGN PATENT DOCUMENTS

| | | |
|---|---|---|
| 0033356 | 8/1981 | European Pat. Off. |
| 0157901 | 10/1985 | European Pat. Off. |
| 0286077 | 10/1988 | European Pat. Off. |
| 0321309 | 6/1989 | European Pat. Off. |
| 0413104 | 2/1991 | European Pat. Off. |
| 3839381 | 1/1990 | Fed. Rep. of Germany |
| 61-195208 | 8/1986 | Japan |
| 61-211614 | 9/1986 | Japan |
| 62-175511 | 8/1987 | Japan |
| 63-279013 | 11/1988 | Japan |
| 63-282414 | 11/1988 | Japan |
| 1-225802 | 9/1989 | Japan |
| 2-166306 | 6/1990 | Japan |
| 3-233207 | 10/1991 | Japan |
| 3-244907 | 10/1991 | Japan |
| 9009549 | 8/1990 | World Int. Prop. O. |

*Primary Examiner*—Edward G. Favors
*Attorney, Agent, or Firm*—Wenderoth, Lind & Ponack

[57] ABSTRACT

An incinerator designed so that the reaction of unburnt gas with oxygen progresses rapidly to thereby minimize the amount of unburnt gas generated therefrom. An intermediate portion of a combustion chamber is contracted in the cross-sectional direction with respect to the direction of flow of gas to thereby provide a throttling passage (14) over a predetermined distance. A part of the combustion chamber which is below the throttling passage (14) and a part of the combustion chamber which is above the passage (14) are enlarged in the cross-sectional direction to define a lower combustion chamber (13) and an upper combustion chamber (15), respectively. A first barrier (16) is disposed in the vicinity of the inlet of the throttling passage (14) across the lower combustion chamber (13) and a second barrier (17) is disposed in the vicinity of the outlet of the throttling passage (14) across the upper combustion chamber (15).

20 Claims, 5 Drawing Sheets

INCINERATOR

This application is a continuation application of parent application Ser. No. 07/863,040 filed Apr. 3, 1992 and now abandoned.

BACKGROUND OF THE INVENTION

The present invention relates to an incinerator for municipal refuse which is designed so that the amount of unburnt gas generated therefrom is minimized.

As means of minimizing the amount of unburnt gas generated from an incinerator, various techniques have heretofore been proposed: for example, "Refuse Incinerating Method and Apparatus therefor" disclosed in Japanese Patent Laid-Open (KOKAI) No. 63-282414, and "Apparatus for Controlling $NO_x$ and Unburnt Gas Generated from Fluidized-Bed Incinerator" disclosed in Japanese Patent Laid-Open (KOKAI) No. 63-279013.

In either of the above-described techniques, a secondary air injection device is disposed across a combustion chamber to promote mixing of oxygen and unburnt gas by vortex flow produced by the injected air, thereby controlling the generation of harmful substances.

However, in either of the above-described prior arts, the mixing of secondary air and unburnt gas depends upon the penetration force of the injected air (i.e., the flow velocity at which secondary air is blown into the combustion chamber). Accordingly, as the distance from the secondary air injection ports increases, the stirring force becomes weaker rapidly, so that there is a possibility that unburnt gas will pass through a region where the injected secondary air exerts no effect, resulting in a failure to achieve mixing of the unburnt gas and the air. If the number of air injection ports is increased in order to prevent such a problem, the penetration force of the injected air becomes weak undesirably.

Even if a throttle portion is provided in the post-stage as in the apparatus disclosed in Japanese Patent Laid-Open (KOKAI) No. 63-282414, unburnt gas that passes without contacting the air may also pass through the throttle portion without contacting the air.

SUMMARY OF THE INVENTION

In view of the above-described circumstances, it is an object of the present invention to provide an incinerator which is designed so that the reaction of unburnt gas with oxygen progresses reliably and rapidly without the possibility of the unburnt gas being discharged without reacting with oxygen, thereby minimizing the amount of unburnt gas generated from the incinerator.

To solve the above-described problems, the present invention provides an incinerator wherein an object of incineration is burned in either a fire grate part or a fluidized sand bed part and combustion gas generated is introduced into a combustion chamber provided directly above the fire grate part or the fluidized sand bed part and in communication therewith and mixed with secondary air in the combustion chamber, thereby completing the combustion with a predetermined residence time, comprising: a throttling passage extending over a predetermined distance which is defined by an intermediate portion of the combustion chamber that is contracted in the cross-sectional direction with respect to the direction of flow of gas to increase the flow velocity at which gas passes therethrough; a lower combustion chamber defined by a part of the combustion chamber which is below the throttling passage and which is enlarged in the cross-sectional direction; an upper combustion chamber defined by a part of the combustion chamber which is above the throttling passage and which is enlarged in the cross-sectional direction; a first barrier disposed in the vicinity of an inlet of the throttling passage across the lower combustion chamber so as to branch the flow of combustion gas into two substantially equivalent streams, the first barrier having a hollow structure the side wall of which is formed with a plurality of secondary air injection ports for jetting out secondary air in a direction counter to or crossing the flow of combustion gas; and a second barrier disposed in the vicinity of an outlet of the throttling passage across the upper combustion chamber so as to branch the flow of combustion gas into two substantially equivalent streams.

Thus, a throttling passage is provided in an intermediate portion of the combustion chamber, and a part of the combustion chamber which is below the throttling passage is defined as a lower combustion chamber, and a part of the combustion chamber which is above the throttling passage is defined as an upper combustion chamber. In addition, a first barrier is disposed in the vicinity of an inlet of the throttling passage across the lower combustion chamber so as to branch the flow of combustion gas into two substantially equivalent streams, and a second barrier is disposed in the vicinity of an outlet of the throttling passage across the upper combustion chamber so as to branch the flow of combustion gas into two substantially equivalent streams. Accordingly, combustion gas that is generated in the lower combustion chamber is branched by the first barrier into substantially two gas streams. After being accelerated, these gas streams collide and join with each other at the inlet of the throttling passage. Further, the combustion gas passing through the throttling passage collides against the second barrier provided in the vicinity of the outlet of the throttling passage. In other words, strong stirring force can be obtained by making the best use of the kinetic energy that the combustion gas possesses by the combination of the two barriers which are respectively disposed in the vicinities of the inlet and outlet of the throttling passage so as to retard the flow of the combustion gas. There is therefore no possibility of the unburnt gas being discharged without reacting with oxygen. Thus, the reaction of the unburnt gas with oxygen progresses reliably and rapidly, so that it is possible to minimize the amount of unburnt gas discharged from the incinerator.

DETAILED DESCRIPTION OF THE PREFERRED EMBODIMENTS

Embodiments of the present invention will be described below with reference to the accompanying drawings. It should be noted that the present invention is not necessarily limited to these embodiments.

Figure 1:
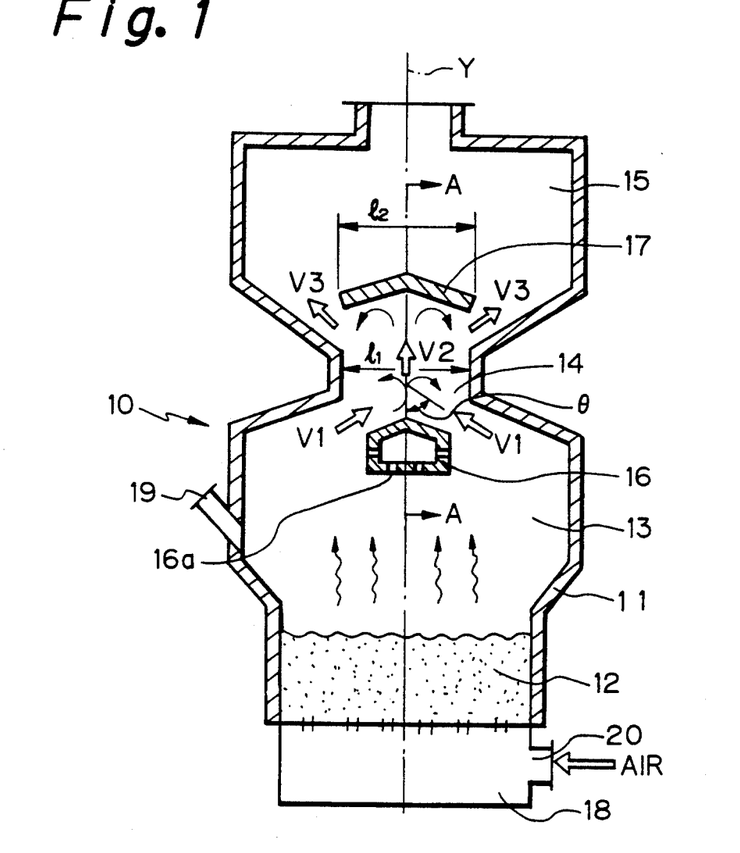
FIG. 1 is a vertical sectional view showing the structure of an incinerator according to the present invention.
Figure 2:
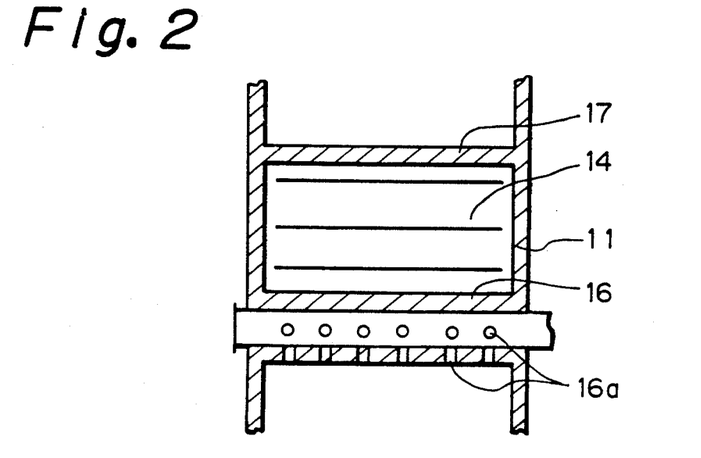
FIG. 2 is a sectional view taken along the line A—A of FIG. 1.

FIGS. 1 and 2 show the structure of an incinerator according to the present invention. FIG. 1 is a vertical sectional view of the incinerator, and FIG. 2 is a sectional view taken along the line A—A of FIG. 1. As illustrated, an incinerator 10 has a fluidized sand bed 12, a lower combustion chamber 13, a throttling passage 14, and an upper combustion chamber 15, which are disposed in the mentioned order from the bottom to the top and which are surrounded with a furnace wall 11.

More specifically, the throttling passage 14 is a passage with a predetermined length which is formed by contracting an intermediate portion of the combustion chamber in the cross-sectional direction with respect to the direction of flow of gas to increase the flow velocity at which gas passes therethrough. A part of the combustion chamber which is below the throttling passage 14 is defined as the lower combustion chamber 13, while a part of the combustion chamber which is above the passage 14 is defined as the upper combustion chamber 15. A first barrier 16 is disposed in the vicinity of the inlet of the throttling passage 14 across the lower combustion chamber 13 so as to branch the flow of combustion gas into two substantially equivalent streams, and a second barrier 17 is disposed in the vicinity of the outlet of the throttling passage 14 across the upper combustion chamber 15 so as to branch the flow of combustion gas into two substantially equivalent streams.

The first barrier 16 disposed in the vicinity of the inlet of the throttling passage 14 has a hollow structure which is coated with a refractory at the outer periphery thereof. The bottom and side portions of the first barrier 16 are formed with a plurality of secondary air injection ports 16a for jetting out secondary air in respective directions counter to and crossing the flow of combustion gas. The first barrier 16 may be formed by using a water tube coated with a refractory at the outer peripheral surface thereof. The second barrier 17 disposed in the vicinity of the outlet of the throttling passage 14 is coated with a refractory at the outer peripheral surface thereof. It is preferable that the upper end face of the second barrier 17 be convex with a view to preventing accumulation of dust. The second barrier 17 may be formed by using a water tube coated with a refractory at the outer peripheral surface thereof.

In addition, the second barrier 17 may have a hollow structure the side walls of which are provided with a plurality of secondary air injection ports for jetting out secondary air in a direction counter to or crossing the direction of flow of unburnt gas, in the same way as in the case of the first barrier 16.

A wind box 18 is provided under the fluidized sand bed 12. One side of the wind box 18 is provided with a primary air inlet port 20. In addition, the furnace wall 11 that defines the side wall of the lower combustion chamber 13 is provided with a refuse inlet port 19. The fluidized sand bed 12 is fluidized by primary air blown into the furnace from the primary air inlet port 20. When refuse which is to be incinerated is cast onto the fluidized sand bed 12 from the refuse inlet port 19, the refuse is gasified by the heat of the fluidized sand bed 12 at high temperature (the gas including a large amount of unburnt gas).

The flow of the gas is retarded by the furnace wall 11 that defined the top wall of the lower combustion chamber 13 and the first barrier 16 so that the gas stays in the lower combustion chamber 13 as long as possible. In this state, secondary air is blown into the gas from the secondary air injection ports 16a so that the secondary air and the unburnt gas mix with each other. Further, the flow of the mixed gas is branched by the first barrier 16 into two substantially equivalent streams, which pass through respective passages defined between the furnace wall 11 and the first barrier 16 and then collide and join with each other in the throttling passage 14. Since the cross-sectional area of the throttling passage 14 is small, the flow velocity of the gas is increased and, at the same time, the secondary air and the unburnt gas are stirred and mixed vigorously.

The gas that is accelerated in the throttling passage 14 flows into the upper combustion chamber 15 having a relatively wide cross-sectional area. Since the second barrier 17 is disposed in the vicinity of the outlet of the throttling passage 14, the flow of the gas is also retarded at the second barrier 17 and branched into two substantially equivalent streams, which pass through respective passages defined between the furnace wall 11 and the second barrier 17 and join each other again in the upper combustion chamber 15.

The combustion gas that has been substantially completely mixed together in the above-described process stays for a predetermined time in the upper combustion chamber 15 with its high temperature maintained. Thereafter, the gas is discharged from the gas outlet. The apparatus is arranged such that the average residence time of gas in the area extending from the first barrier 16 to the combustion gas outlet of the upper combustion chamber 15 is not less than 1 second.

The angle $\theta$ of the direction of the main stream of gas flowing into the throttling passage 14 from the area between the first barrier 16 and the top wall of the lower combustion chamber 13 with respect to the axis Y of the throttling passage 14 is set in the range of $90° \geq \theta \geq 30°$.

The average flow velocity V1 of the gas flowing into the throttling passage 14 from the area between the first barrier 16 and the top wall of the lower combustion chamber 13 is set in the range of from 8 m/s to 10 m/s, while the average flow velocity V2 of the gas passing through the throttling passage 14 is set in the range of from 6 m/s to 10 m/s, and the average flow velocity V3 of the gas passing through the area between the second barrier 17 and the bottom wall of the upper combustion chamber 15 after flowing out of the throttling passage 14 is set in the range of from 4 m/s to 6 m/s.

In addition, the width l2 of the second barrier 17 is not smaller than the width l1 of the throttling passage 14.

Figure 3:
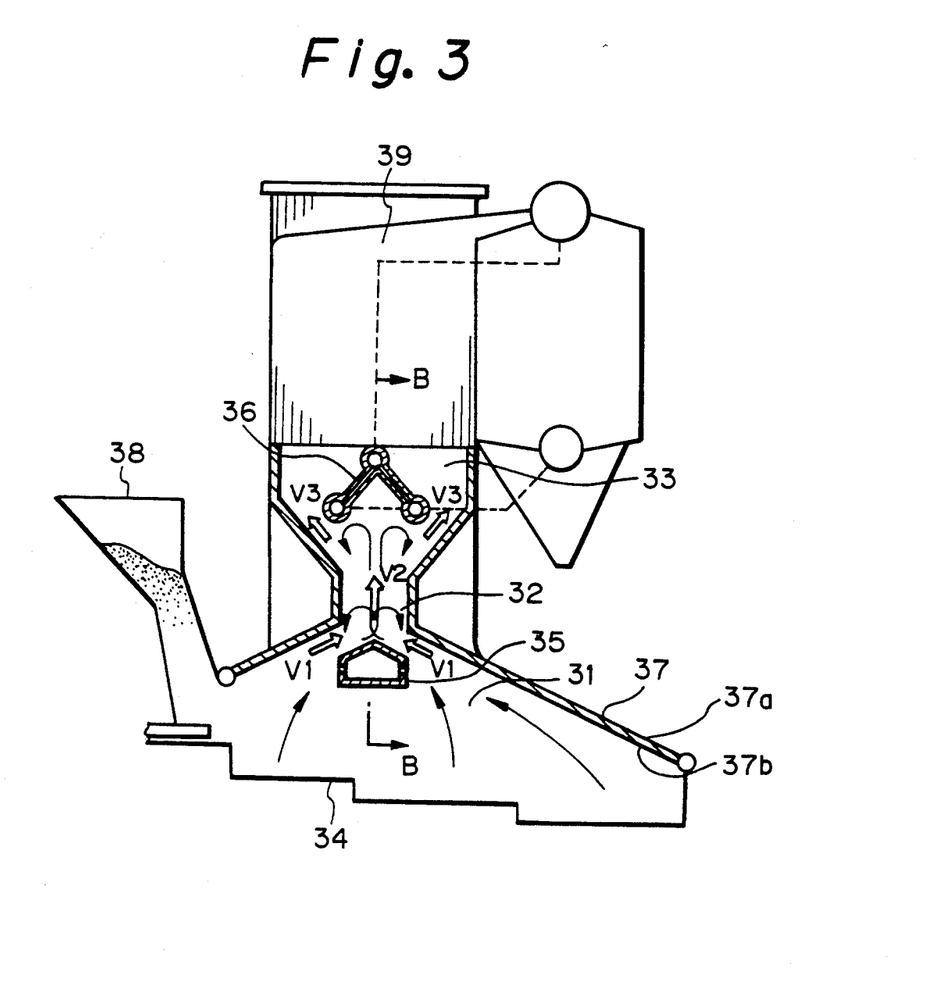
FIG. 3 is a vertical sectional view showing the structure of another incinerator according to the present invention.
Figure 4:
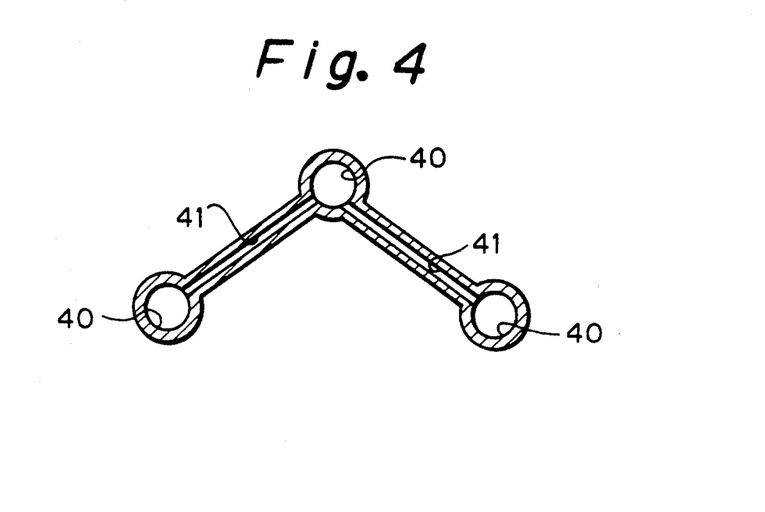
FIG. 4 is an enlarged sectional view showing the structure of a second barrier.
Figure 5:
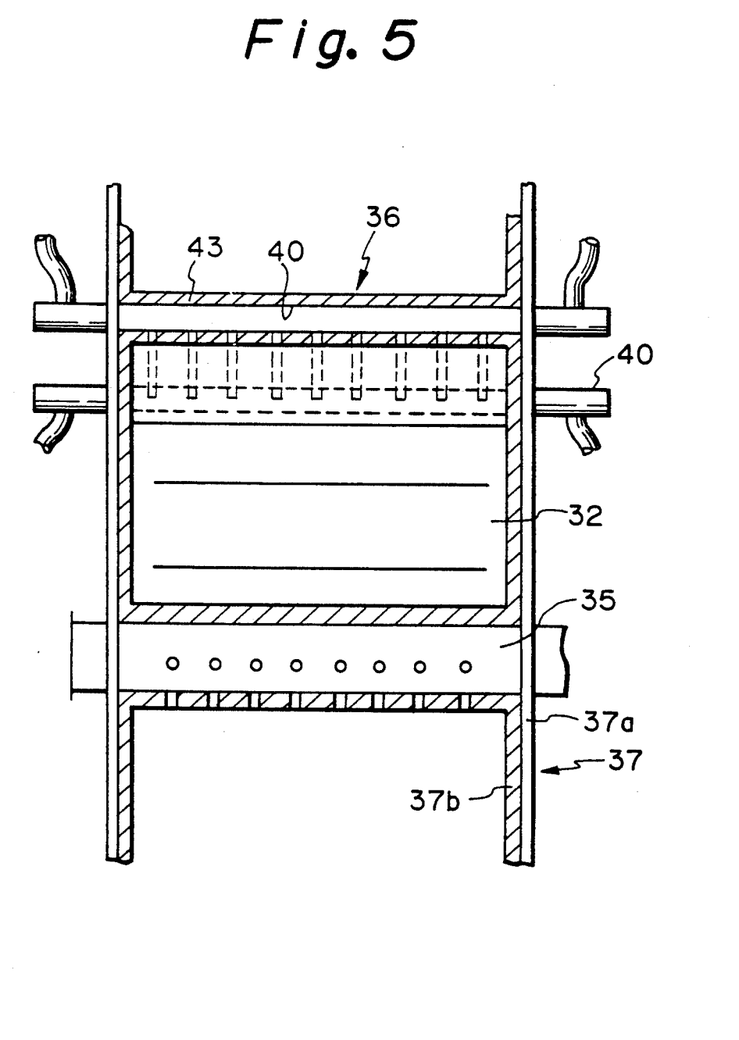
FIG. 5 is a sectional view taken along the line B—B of FIG. 4.

FIGS. 3 to 5 show the structure of another incinerator according to the present invention. FIG. 3 is a vertical sectional view of the incinerator, while FIG. 4 is an enlarged view showing the structure of a second barrier of the incinerator, and FIG. 5 is a sectional view taken along the line B—B of FIG. 3. This incinerator is a stoker fired furnace in which a lower combustion chamber 31 that is defined directly above a fire grate 34, a throttling passage 32 and an upper combustion chamber 33 are disposed in the mentioned order from the bottom to the top. The furnace has a wall 37 the outer side of which comprises a water tube wall 37a and the inner side of which comprises a refractory 37b.

A first barrier 35 is disposed in the vicinity of the inlet of the throttling passage 32 across the lower combustion chamber 31 so that the flow of combustion gas can be branched into two substantially equivalent streams, and a second barrier 36 is disposed in the vicinity of the outlet of the throttling passage 32 across the upper combustion chamber 33 so that the flow of combustion gas can be branched into substantially equivalent streams. A refuse inlet port 38 is disposed at one side of the lower combustion chamber 31, and heat recovery equipment 39, e.g., a boiler, is disposed at the top of the upper combustion chamber 33.

The first barrier 35 has substantially the same structure as that of the first barrier 16 of the incinerator shown in FIGS. 1 and 2. The first barrier 35 may be formed by using a water tube coated with a refractory at the outer peripheral surface thereof.

The second barrier 36 comprises three headers 40 which are connected by water tubes 41 and 42, and the outer surface of the second barrier 36 is coated with a refractory 43, as shown exemplarily in FIG. 4.

It should be noted that the angle $\theta$ of the direction of the main stream of gas flowing into the throttling passage 32 from the area between the first barrier 35 and the top wall of the lower combustion chamber 31 with respect to the axis Y of the throttling passage 32 is set in the same way as in the case of the incinerator shown in FIGS. 1 and 2. Also, the average flow velocity $V_1$ of the gas flowing into the throttling passage 32 from the area between the first barrier 35 and the top wall of the lower combustion chamber 31, the average flow velocity $V_2$ of the unburnt gas passing through the throttling passage 32 and the average flow velocity $V_3$ of the unburnt gas passing through the area between the second barrier 36 and the bottom wall of the upper combustion chamber 33 after flowing out of the throttling passage 32 are also set in the same way as in the case of the incinerator shown in FIGS. 1 and 2.

With the incinerator having the above-described structure, the gas (containing a large amount of unburnt gas) that is generated as a result of combustion at the fluidized sand bed 12 (or the fire grate 34) flows into the lower combustion chamber 13 (31) where it mixes with secondary air that is blown thereinto from the first barrier 16 (31) at a proper flow rate. While doing so, the gas is branched by the first barrier 16 (31) into two substantially equivalent streams, which are accelerated to 8 m/s to 10 m/s in the area between the first barrier 16 (31) and the side wall of the lower combustion chamber 13 (31) and then collide and join with each other at the inlet of the throttling passage 14 (32), thereby mixing each other vigorously. Thus, the reaction of the unburnt gas with oxygen progresses rapidly.

The gas streams joining each other at the inlet of the throttling passage 14 (32) pass through the passage 14 (32) while mixing with each other and maintaining the flow velocity of 6 m/s to 10 m/s and then collide against the second barrier 17 (36) located at the outlet section, thus changing the direction of flow. As a result, the gas is branched into two substantially equivalent streams, which pass through the respective passages defined between the second barrier 17 (36) and the bottom wall of the upper combustion chamber 15 (33) and flow into the upper combustion chamber 15 (33) at a flow rate of 4 m/s to 6 m/s.

The combustion gas that has been substantially completely mixed together in the above-described process stays for a predetermined time in the upper combustion chamber 15 (33) with its high temperature maintained. Thereafter, the gas is discharged from the gas outlet. The apparatus is arranged such that the average residence time of gas in the area extending from the first barrier 16 (32) to the combustion gas outlet of the upper combustion chamber 15 (33) is not less than 1 second.

Figures 6, 7:
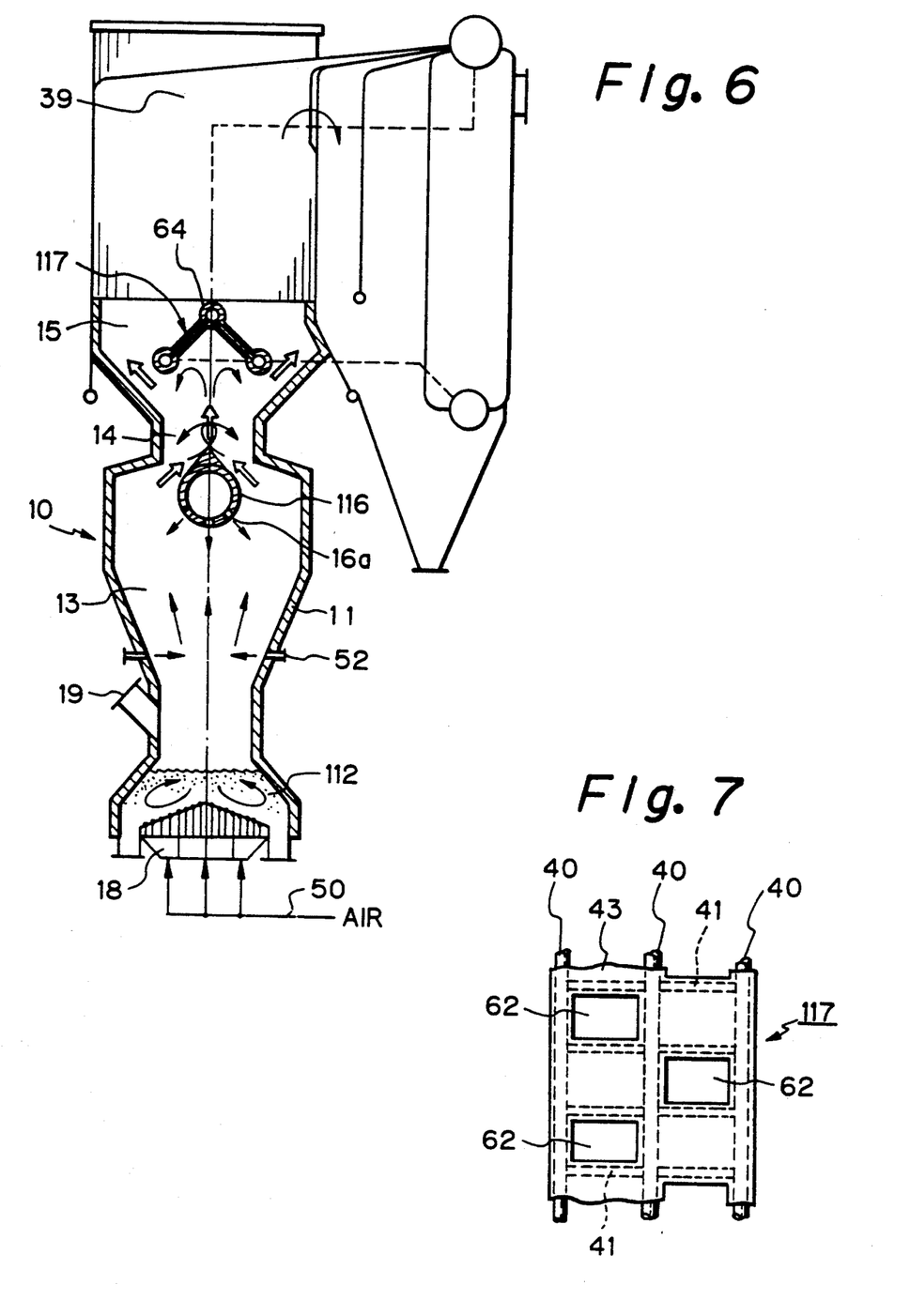
FIG. 6 is a vertical sectional view showing another incinerator embodying the present invention.
FIG. 7 is a plan view showing a second barrier employed in the incinerator shown in FIG. 6.

FIG. 6 is a schematical view of a vertical section of another incinerator embodying the present invention. In FIG. 6, the incinerator comprises a lower combustion chamber 13, a throttling passage 14, an upper combustion chamber 15, and heat recovery equipment 39, as dose the incinerator in FIG. 1.

The incinerator in FIG. 6 also includes a fluidized sand bed 112, a first barrier 116 with a plurality of secondary air injection ports 16a and a second barrier 117, the structures of these portions are slightly different from corresponding portions in the incinerator shown in FIG. 1. Subsidiary air injection ports 52 are located at the wall of the lower combustion chamber 13.

In FIG. 6, the fluidized sand bed 112 comprises a circulating type fluidized bed in which there is a zone where fluidization is relatively strong and a fluidized medium tends to move upwardly, another zone where fluidization is relatively weak and the medium tends to descend and, at the upper and lower parts of these zones the medium in the respective parts tends to move laterally to the other two zones so that complete circulation of the bed is effected. The two different zones are formed by changing air flow rates from wind boxes 18 into each of the two zones. Air is supplied to the wind boxes 18 through an air line 50. Such a circulating type fluidized bed itself is known and disclosed in the prior publications, e.g. U.S. Pat. Nos. 4,452,155, and 4,823,740.

The first barrier 116 has a cross section which comprises a ring portion and an angular portion located on the upper side of the ring portion. The angles of the surfaces formed on the angular portion to the horizon are selected so that ash falling on the surfaces slides off thereby preventing any accumulation of ash.

The second barrier 117 shown in FIGS. 6 and 7 comprises three headers 40 which are connected by water tubes 41 and coated with refractory 43. The second barrier 117 is different from the second barrier 36 shown in FIG. 4 in the point that it comprises a plurality of opening portions 62 which are arranged in a zigzag configuration in the plan view as shown in FIG. 7, that is the second barrier comprises two plate portions each of which has a plurality of opening portions 62 which are connected each other along a horizontally extending ridgeline 64. The opening portions 62 are arranged in zigzags along the ridgeline 64.

In FIG. 7, the combustion gas which flows through the opening portions 62 of the second barrier 117 generates a plurality of small turbulences and promotes mixing of oxygen and unburnt gas.

Figure 8:
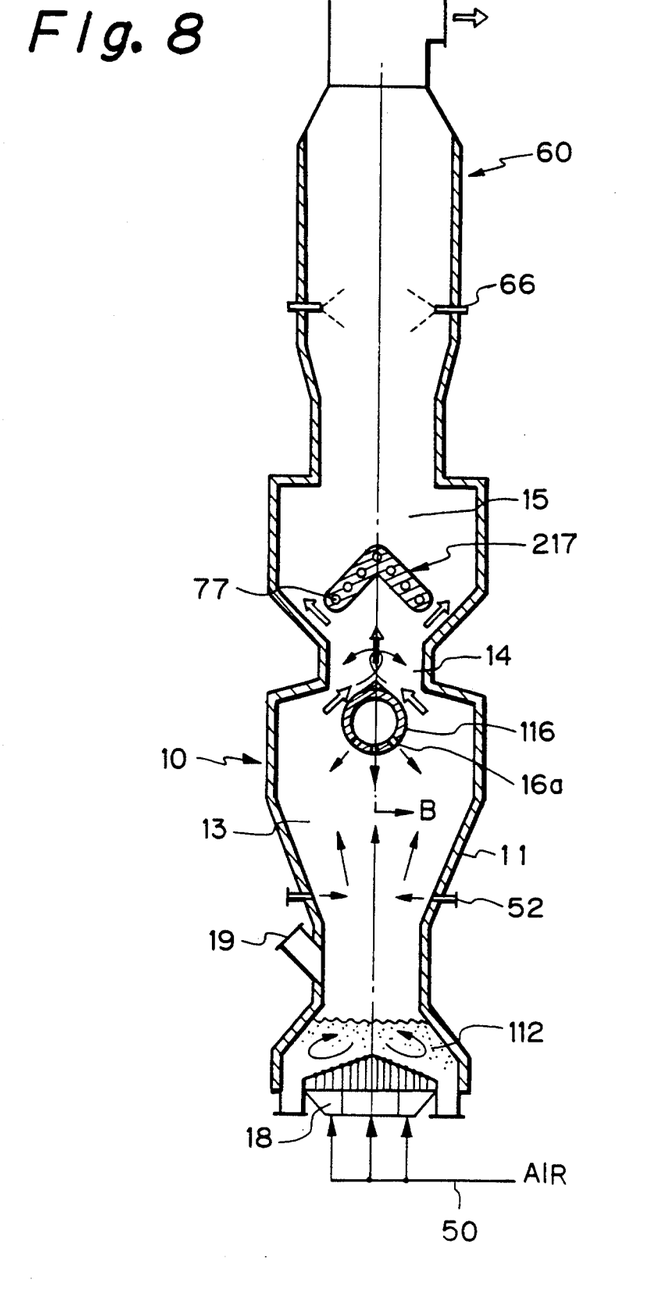
FIG. 8 is a vertical sectional view showing yet another incinerator embodying the present invention.

FIG. 8 is a schematical view of a vertical section of yet another incinerator embodying the present invention. In FIG. 8, the incinerator comprises a fluidized sand bed 112 having a circulating type fluidized bed, a lower combustion chamber 13, a throttling passage 14, a first barrier 116 with a plurality of secondary air injection ports 16a, and a second barrier 217, as dose the incinerator in FIG. 6.

The incinerator in FIG. 8 also includes a gas cooling tower 60 provided with a plurality of water spray nozzles 66 instead of heat recovery equipment 39 in FIGS. 3 and 6. The gas cooling tower 60 is operated to cool the exhaust gas by spraying water into the gas through the water spray nozzles 66 in order to prevent thermal damage of a draft fan or some other equipment connected to the incinerator. A draft fan is provided to draw the combustion gas from the incinerator and to discharge it into the atmosphere.

In FIG. 8, the second barrier 217 is made of a refractory material and includes coolant passages 77. The upper end surface of the second barrier 117 is convex similar to that shown in FIG. 1, with a view to preventing accumulation of dust or ash.

The incinerator shown in FIG. 8 is suitable for incinerating material, e.g. municipal refuse, which has a low caloric value it may also be built as a comparatively small scale plant.

Thus, according to the foregoing embodiments, the incinerator is arranged such that the gas streams collide with each other and also collide against the first and second barriers so that the gas streams are effectively stirred and mixed together. Accordingly, it is possible to substantially completely prevent the unburnt gas from being discharged from the gas outlet without burning as in the prior art.

EFFECT OF THE INVENTION

In the present invention, the first barrier disposed in the vicinity of the inlet of the throttling passage has the functional effect that secondary air injected from the inside of the first barrier into the lower combustion chamber is mixed to react with the unburnt gas ascending from the fluidized sand bed. The first barrier has a damping effect on the unburnt gas flow and increases the residence time of the gas in the lower combustion chamber. The combustion gas in which most of gas reacts with oxygen and is completed in combustion and mixed with partially unburnt gas in the lower combustion chamber is divided into two gas flows by the first barrier. The first barrier cooperates with the inlet portion of the throttling passage to accelerate the flow speed of the two gas flows and cause them to collide with each other in the throttling passage.

The throttling passage in the present invention is formed to reduce the cross sectional area of the passage through which the combustion gas ascends so that the two gas flows divided by the first barrier are accelerated to a flowing speed of 8 to 10 meters per second, and collide with each other. The throttling passage greatly enhances mixing of the gas by causing the gas flows themselves to collide with each other as compared to simple diffusion mixing effected by turbulence around the barrier. The throttling passage has the cross sectional area in which the gas flows at an average speed of 6 to 8 meters per second after collision and reduces the amount of unburnt gas passing in the vicinity of the furnace wall compared to the case where there is no throttling passage.

The second barrier disposed in the vicinity of the outlet of the throttling passage across the upper combustion chamber is preferably formed so that its width 12 is longer than the width 11 of the throttling passage in order to retain the unburnt gas tending to pass in the vicinity of the furnace wall in the throttling passage. Most parts of the gas flowing through the throttling passage collide with the lower surface of the second barrier and this mixing thereof is promoted. The second barrier has the effect that it insulates heat radiation from the throttling passage to the heat recovery equipment or the gas cooling tower and keeps the gas at the throttling passage at a high temperature so as not to deenergize the reaction of the gas. The second barrier has an outer surface made of refractory material and is able to generate heat radiation from the surface of the refractory material to the gas, which further promotes the reaction of the gas.

In the present invention, the first barrier, the throttling passage and the second barrier operate in conjunction with one another to promote the mixing and reaction of oxygen and unburnt gas and, therefore, these elements are indispensable to the present invention.

As has been described above, the present invention provides the following advantageous effects:

(1) Unburnt gas and secondary air can be mixed together substantially completely by the strong stirring force obtained through the collision between combustion gas streams and that between the combustion gas and the barriers by utilizing the kinetic energy the gas possesses, so that it is possible to prevent the unburnt gas from being discharged without burning.

(2) Since the unburnt gas and secondary air are effectively mixed together, it is possible to reduce the amount of secondary air blown into the furnace (i.e., possible to lower the excess air ratio) and maintain the combustion gas at high temperature and hence possible to promote decomposition of harmful substances, e.g., dioxin.

(3) By virtue of the above-described advantageous effects, it is possible according to the present invention to minimize the amount of unburnt gas, e.g., CO, discharged from an incinerator for municipal refuse and also reduce the discharge of harmful substances, e.g., dioxin.

What is claimed is:

1. An incinerator wherein an object of incineration is burned in either a fire grate part or a fluidized sand bed part and combustion gas generated is introduced into a combustion chamber provided directly above said fire grate part or said fluidized sand bed part and in communication therewith and mixed with secondary air in said combustion chamber, thereby completing the combustion with a predetermined residence time, comprising:

a throttling passage extending over a predetermined distance which is defined by an intermediate portion of said combustion chamber that is contracted in the cross-sectional direction with respect to the direction of flow of gas to increase the flow velocity at which gas passes therethrough;

a lower combustion chamber defined by a part of said combustion chamber which is below said throttling passage and which is enlarged in the cross-sectional direction;

an upper combustion chamber defined by a part of said combustion chamber which is above said throttling passage and which is enlarged in the cross-sectional direction;

a first barrier disposed in the vicinity of an inlet of said throttling passage across said lower combustion chamber so as to branch the flow of combustion gas into two substantially equivalent streams, said first barrier having a hollow structure the side wall of which is formed with a plurality of secondary air injection ports for jetting out secondary air in a direction counter to or crossing the flow of combustion gas; and a second barrier disposed in the vicinity of an outlet of said throttling passage across said upper combustion chamber so as to branch the flow of combustion gas into two substantially equivalent streams.

2. An incinerator according to claim 1, wherein the outer peripheries of said first and second barriers are coated with a refractory.

3. An incinerator according to claim 1, wherein said first and second barriers are each formed by using a water tube the outer periphery of which is coated with a refractory.

4. An incinerator according to claim 1, wherein said upper and lower combustion chambers and said throttling passage are formed by using a water tube wall, and a high-speed gas contact portion of said water tube wall is coated with a refractory.

5. An incinerator according to claim 1, wherein the flow velocity of combustion gas flowing into said throttling passage through the smallest cross-sectional area defined between said first barrier and said lower combustion chamber is in the range of from 8 m/s to 10 m/s, while the flow velocity of combustion gas in said throttling passage is in the range of from 6 m/s to 10 m/s, and the flow velocity of combustion gas flowing out through the smallest cross-sectional area defined between said second barrier and said upper combustion chamber is in the range of from 4 m/s to 6 m/s.

6. An incinerator according to claim 1, wherein the width of said second barrier is not smaller than the width of said throttling passage.

7. An incinerator according to claim 1, wherein the direction of the main stream of combustion gas flowing into said throttling passage is at an angle of not larger than 90° and not smaller than 30° to the axis of said throttling passage.

8. An incinerator according to claim 1, wherein the average residence time of gas in the area extending from said secondary air injection ports of said first barrier to a combustion gas outlet of said upper combustion chamber is not less than 1 second.

9. An incinerator according to claim 1, wherein said second barrier comprises two plate portions each of which has a plurality of opening portions connected to each other along a horizontally extending ridgeline, said opening portions being arranged in a zigzag configuration along the ridgeline.

10. An incinerator according to claim 1, wherein said fluidized sand bed is a circulating type fluidized bed.

11. An incinerator according to claim 1, wherein the combustion gas is released from said combustion chamber through heat recovery equipment into the atmosphere.

12. An incinerator according to claim 1, wherein the combustion gas is released from said combustion chamber through a water injection type gas cooling tower and a draft fan into the atmosphere.

13. An incinerator according to claim 2, wherein said upper and lower combustion chambers and said throttling passage are formed by using a water tube wall, and a high-speed gas contact portion of said water tube wall is coated with a refractory.

14. An incinerator according to claim 3, wherein said upper and lower combustion chambers and said throttling passage are formed by using a water tube wall, and a high-speed gas contact portion of said water tube wall is coated with a refractory.

15. An incinerator according to claim 2, wherein said second barrier comprises two plate portions each of which has a plurality of opening portions connected to each other along a horizontally extending ridgeline, said opening portions being arranged in a zigzag configuration along the ridgeline.

16. An incinerator according to claim 3, wherein said second barrier comprises two plate portions each of which has a plurality of opening portions connected to each other along a horizontally extending ridgeline, said opening portions being arranged in a zigzag configuration along the ridgeline.

17. An incinerator according to claim 2, wherein said fluidized sand bed is a circulating type fluidized bed.

18. An incinerator according to claim 3, wherein said fluidized sand bed is a circulating type fluidized bed.

19. An incinerator according to claim 2, wherein the combustion gas is released from said combustion chamber through a water injection type gas cooling tower and a draft fan into the atmosphere.

20. An incinerator according to claim 3, wherein the combustion gas is released from said combustion chamber through a water injection type gas cooling tower and a draft fan into the atmosphere.

* * * * *